United States Patent
Cole et al.

(10) Patent No.: US 8,526,810 B2
(45) Date of Patent: Sep. 3, 2013

(54) EYE SAFETY AND INTEROPERABILITY OF ACTIVE CABLE DEVICES

(75) Inventors: Christopher R. Cole, Redwood City, CA (US); Lewis B. Aronson, Los Altos, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 1159 days.

(21) Appl. No.: 12/112,214

(22) Filed: Apr. 30, 2008

(65) Prior Publication Data

US 2008/0267620 A1    Oct. 30, 2008

Related U.S. Application Data

(60) Provisional application No. 60/915,077, filed on Apr. 30, 2007.

(51) Int. Cl.
*H04B 17/00* (2006.01)
(52) U.S. Cl.
USPC ............................................. 398/10; 398/15
(58) Field of Classification Search
USPC ..................................................... 398/15, 10
See application file for complete search history.

(56) References Cited

U.S. PATENT DOCUMENTS

| | | | |
|---|---|---|---|
| 4,393,493 A | 7/1983 | Edwards | |
| 4,994,675 A * | 2/1991 | Levin et al. | 250/551 |
| 5,069,521 A * | 12/1991 | Hardwick | 385/24 |
| 5,121,244 A | 6/1992 | Taksaki | |
| 5,122,892 A | 6/1992 | Cloonan et al. | |
| 5,216,666 A | 6/1993 | Stalick | |
| 5,299,293 A | 3/1994 | Mestdagh et al. | |
| 5,313,456 A | 5/1994 | Sugawara et al. | |
| 5,475,676 A | 12/1995 | Takatori et al. | |
| 5,515,361 A * | 5/1996 | Li et al. | 370/222 |
| 5,708,753 A | 1/1998 | Frigo et al. | |

(Continued)

FOREIGN PATENT DOCUMENTS

| JP | 11-194238 A | 7/1999 |
|---|---|---|
| JP | 2006-114684 A | 4/2006 |

(Continued)

OTHER PUBLICATIONS

Joiner, Steve, "Open Fiber Control for Parallel Optics," Hewlett Packard, Communication Semiconductor Solutions Division, Mar. 27, 1997.

(Continued)

*Primary Examiner* — Danny Leung
(74) *Attorney, Agent, or Firm* — Maschoff Brennan

(57) ABSTRACT

An integrated cable configured to communicate over much of its length using one or more optical fibers includes an electrical connector at least one end. The electrical connector at a first end of the integrated cable and an optoelectronic device coupled to or included in the other end of the integrated cable may utilize a bidirectional status link to transmit status data to each other. If the status data indicates that optical signals transmitted over the optical channels between the two devices are not potentially exposed to view, the two devices may operate above nominal eye safety limits. Otherwise, the two devices may operate at or below nominal eye safety limits. If the second optoelectronic device is not status-link enabled, the first optoelectronic device may operate at or below nominal eye safety limits.

15 Claims, 10 Drawing Sheets

(56) References Cited

U.S. PATENT DOCUMENTS

| | | |
|---|---|---|
| 5,995,256 A | 11/1999 | Fee |
| 6,005,694 A | 12/1999 | Liu |
| 6,081,359 A | 6/2000 | Takehana et al. |
| 6,295,272 B1 | 9/2001 | Feldman et al. |
| 6,359,713 B1 | 3/2002 | DeCusatis et al. |
| 6,366,373 B1 | 4/2002 | MacKinnon et al. |
| 6,483,616 B1 | 11/2002 | Maddocks et al. |
| 6,897,424 B2 * | 5/2005 | Suzuki .................. 250/205 |
| 6,915,075 B1 | 7/2005 | Oberg et al. |
| 6,931,183 B2 | 8/2005 | Panak et al. |
| 6,965,735 B2 | 11/2005 | Wu et al. |
| 7,046,928 B1 | 5/2006 | Bradford et al. |
| 7,099,578 B1 | 8/2006 | Gerstel |
| 7,212,739 B2 | 5/2007 | Graves et |
| 7,242,860 B2 | 7/2007 | Ikeda et al. |
| 7,302,190 B2 | 11/2007 | Goto et al. |
| 7,359,639 B2 | 4/2008 | Wolcott et al. |
| 7,389,045 B2 | 6/2008 | Fee |
| 7,421,197 B2 | 9/2008 | Palacharla et al. |
| 7,426,346 B2 | 9/2008 | Wang et al. |
| 7,536,101 B1 | 5/2009 | Jones et al. |
| 7,546,034 B2 | 6/2009 | Mueller |
| 7,551,852 B2 | 6/2009 | Reintjes et al. |
| 7,577,358 B2 | 8/2009 | Barbosa et al. |
| 7,613,392 B2 | 11/2009 | Gerstel |
| 7,684,703 B2 | 3/2010 | Harada |
| 7,801,442 B2 | 9/2010 | Wang et al. |
| 7,805,072 B2 | 9/2010 | Lovisa et al. |
| 7,826,745 B2 | 11/2010 | DeCusatis et al. |
| 2002/0012142 A1 | 1/2002 | Gautheron et al. |
| 2002/0030865 A1 | 3/2002 | Kawate et al. |
| 2002/0114038 A1 | 8/2002 | Arnon et al. |
| 2003/0002109 A1 * | 1/2003 | Hochberg et al. ............ 359/152 |
| 2003/0025957 A1 | 2/2003 | Jayakumar |
| 2003/0095303 A1 * | 5/2003 | Cunningham et al. ........ 359/110 |
| 2003/0133712 A1 | 7/2003 | Arikawa et al. |
| 2004/0008988 A1 | 1/2004 | Gerstal et al. |
| 2004/0257642 A1 | 12/2004 | Fishman et al. |
| 2006/0018659 A1 | 1/2006 | Sekine et al. |
| 2006/0067690 A1 | 3/2006 | Tatum et al. |
| 2006/0077778 A1 | 4/2006 | Tatum et al. |
| 2006/0153503 A1 | 7/2006 | Suzuki et al. |
| 2006/0182445 A1 | 8/2006 | Lee et al. |
| 2006/0285847 A1 | 12/2006 | McCall et al. |
| 2007/0058976 A1 | 3/2007 | Tatum et al. |
| 2007/0233906 A1 | 10/2007 | Tatum et al. |
| 2007/0237462 A1 | 10/2007 | Aronson et al. |
| 2007/0237463 A1 | 10/2007 | Aronson |
| 2007/0237464 A1 | 10/2007 | Aronson et al. |
| 2007/0237468 A1 | 10/2007 | Aronson et al. |
| 2007/0237470 A1 | 10/2007 | Aronson et al. |
| 2007/0237471 A1 | 10/2007 | Aronson et al. |
| 2007/0237472 A1 | 10/2007 | Aronson et al. |
| 2009/0060520 A1 | 3/2009 | Cole et al. |

FOREIGN PATENT DOCUMENTS

| | | |
|---|---|---|
| KR | 20-0180217 Y1 | 5/2000 |
| KR | 20-0309948 Y1 | 3/2003 |
| KR | 20-0399085 Y1 | 9/2005 |

OTHER PUBLICATIONS

U.S. Appl. No. 12/039,595, filed Feb. 28, 2008, Cole, et al.
U.S. Appl. No. 12/039,589, filed Feb. 28, 2008, Cole, et al.
U.S. Appl. No. 12/039,595, May 25, 2011, Notice of Allowance.
U.S. Appl. No. 12/039,595, Jan. 6, 2011, Office Action.
U.S. Appl. No. 12/039,589, Feb. 3, 2011, Office Action.
U.S. Appl. No. 12/039,589, Jul. 11, 2011, Office Action.

* cited by examiner

EYE SAFETY AND INTEROPERABILITY OF ACTIVE CABLE DEVICES

CROSS-REFERENCE TO RELATED APPLICATIONS

This application claims priority to U.S. Provisional Patent Application Ser. No. 60/915,077 entitled EYE SAFETY AND INTEROPERABILITY OF ACTIVE CABLE DEVICES, filed Apr. 30, 2007, which provisional application is incorporated herein by reference in its entirety.

BACKGROUND OF THE INVENTION

1. The Field of the Invention

The present invention relates generally to the field of high speed data transmission. More particularly, embodiments of the invention relate to an active integrated cable having one or more electrical connectors and configured to communicate over much of its length using one or more optical fibers.

2. The Relevant Technology

Communication technology has transformed our world. As the amount of information communicated over networks has increased, high speed transmission has become ever more critical. High speed communications often rely on the presence of high bandwidth capacity links between network nodes. There are both copper-based solutions and optical solutions used when setting up a high bandwidth capacity link. A link may typically comprise a transmitter that transmits a signal over a medium to a receiver, either in one direction between two network nodes, or bi-directionally. An optical link might include, for example, an optical transmitter (also referred to herein as an "electro-optical transducer"), a fiber optic medium, and an optical receiver (also referred to herein as an "opto-electrical transducer") for each direction of communication. In duplex mode, an optical transceiver serves as both an optical transmitter that serves to transmit optically over one fiber to the other node, while receiving optical signals over another fiber (typically in the same fiber-optic cable).

Presently, communication at more than 1 gigabit per second (also commonly referred to as "1G") links are quite common. Standards for communicating at 1G are well established. For instance, the Gigabit Ethernet standard has been available for some time, and specifies standards for communicating using Ethernet technology at the high rate of 1G. At 1G, optical links tend to be used more for longer spanning links (e.g., greater than 100 meters), whereas copper solutions tend to be used more for shorter links due in large part to the promulgation of the 1000Base-T standard, which permits 1G communication over standard Category 5 ("Cat-5") unshielded twisted-pair network cable for links up to 100 m.

More recently, high-capacity links at 10 gigabits per second (often referred to in the industry as "10G") have been standardized. As bandwidth requirements increase, potential solutions become more difficult to accomplish, especially with copper-based solutions. One copper-based 10G solution is known as 10GBASE-CX4 (see IEEE Std 802.3ak-2004, "Amendment: Physical Layer and Management Parameters for 10 Gb/s Operation Type 10GBASE-CX4" Mar. 1, 2004), which accomplishes the higher bandwidth, despite the use of copper. 10GBASE-CX4 uses a cable, which includes 4 shielded different pairs carrying a quarter of the bandwidth in each direction, for a total of 8 differential copper pairs. This cable is quite bulky (typically about 0.4" or 10 mm in diameter) and expensive to make and cannot be terminated in the field (as can CAT-5 for example). Furthermore, this copper-based 10G solution is limited to distances of about 15 m without special efforts.

Alternative copper-based 10G solutions are being developed and standardized but are likely also to require significant power consumption. The primary example is known as 10GBASE-T under development in the IEEE (see IEEE draft standard 802.3an, "Part 3: Carrier Sense Multiple Access with Collision Detection (CSMA/CD) Access Method and Physical Layer Specifications Amendment: Physical Layer and Management Parameters for 10 Gb/s Operation, Type 10GBASE-T" 2006). This standard uses CAT5e or CAT6A unshielded twisted pair cable for distances to 55 m and 100 m respectively. However it is expected that because of the extremely complex signal processing required, this standard will require circuitry with very high power dissipation, initially as high as 8-15 Watts (per port and thus twice this per link). A lower power variant which only achieves 30 m on CAT6A cable is still expected to be more than 4 Watts per port. These high power levels represent both a significant increase in operating costs and perhaps more importantly, limitations on the density of ports which can be provided on a front panel. For example, power dissipations of 8-15 W could limit port density to 8 ports or less in the space of a typical 1U rack unit, whereas 1000BASE-T and 1 G optical interfaces such as the SFP transceiver can provide up to 48 ports in the same space. Nevertheless, because of the cost of present day optical solutions at 10G, there remains interest in this copper solution.

In addition to cost, there may be other problems associated with optical solutions. For instance, eye safety is a concern due to the use of lasers. This can be particularly problematic when multiple lasers are used in a parallel fiber or wavelength division multiplexing (WDM) solution, and/or when the laser transmit power is increased for long distance transmission. If an optical fiber over which a signal is being transmitted is severed or unplugged, the signal can be directed to a human eye. At certain frequencies and intensities, the signal can cause minimal to severe damage to the eye. The potential eye damage may increase as the number of signals increases, thereby posing an eye safety risk even if each individual laser's power is well below what is considered safe.

At the present stage, those setting up the high-bandwidth link will often weigh the pros and cons of using a copper-based solution versus an optical solution. Depending on the results of that decision, the systems will be set up with an electrical port if they decided to proceed with a copper-based solution, or an optical port (often more specifically a cage and connector to receive a standard mechanical form factor optical transceiver such as the SFP) if they decided to proceed with an optical solution.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to an active integrated cable that includes an electrical connector at one or both ends, while communicated optically over much of its length using one or more optical fibers. Where the integrated cable includes only one electrical connector, the other end of the integrated cable may include an optical connector configured to be coupled to an optoelectronic device.

A first electrical connector and a second electrical connector of the integrated cable, or an electrical connector of the integrated cable and an optoelectronic device, may be configured to implement a bidirectional status link and channel monitoring to permit operation above eye safety limits while preserving eye safety in the event an optical fiber is severed or otherwise disconnected. If the optoelectronic device is unable to establish status links, the electrical connector may still interoperate with the optoelectronic device by operating in a low transmit power mode.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention described herein relate to the use of an active integrated cable that is exposed at least at one end using an electrical connection, while communicating over much of its length using optical fiber. Additionally, embodiments of the invention permit optical signals to be transmitted within the integrated cable above nominal eye safety limits by establishing a status link between the ends of an optical link of which the integrated cable is all or a part. When the integrated cable is severed or disconnected or optical signals of the link are otherwise potentially exposed to view, the transmit power may be reduced so as not to exceed the eye safety limits. Thus, high-speed and/or long distance signal transmission is permitted within the optical link above eye safety limits. Embodiments of the invention further enable a status-link enabled integrated optical connector to interoperate with a non status-link enabled optoelectronic device In the disclosure that follows, characteristics of an example integrated cable in which embodiments of the invention can be implemented will first be described in some detail. An example of such an integrated cable is described in detail in U.S. patent application Ser. No. 11/402,106 filed Apr. 10, 2006, which is incorporated herein by reference in its entirety. While not all of the embodiments of such an integrated cable will be described herein, several such embodiments will be described with respect to FIGS. 1 through 6. Then, components of an example electrical connector (or optoelectronic device) and controller that may be included within an integrated cable will be described with respect to FIGS. 7 and 8. Finally, methods for operating the integrated cable above eye safety limits and interoperating with other devices will be described with respect to FIGS. 9 through 12.

The integrated cable according to embodiments of the invention may be exposed at least at one end using an electrical connector, while communicating over much of its length using optical fiber. Thus, those designing or selecting networking equipment or administrating network nodes need not choose a copper-based solution or an optical solution in communicating over a network. Instead, the network node need only have an electrical port or receptacle of some type to thereby support either copper-based communication or optical communication. In addition to network applications, such a cable can support point to point high speed serial connections such as the transmission of serialized video data from a source to a display. The communication over the optical fiber may be high speed and suitable for 10G applications and higher. Cable designs which are purely electrical but mechanically and electrically interoperate with the optical cables described herein may be included as part of a complete system to provide the most effective solutions over the widest range of applications.

Figure 1:
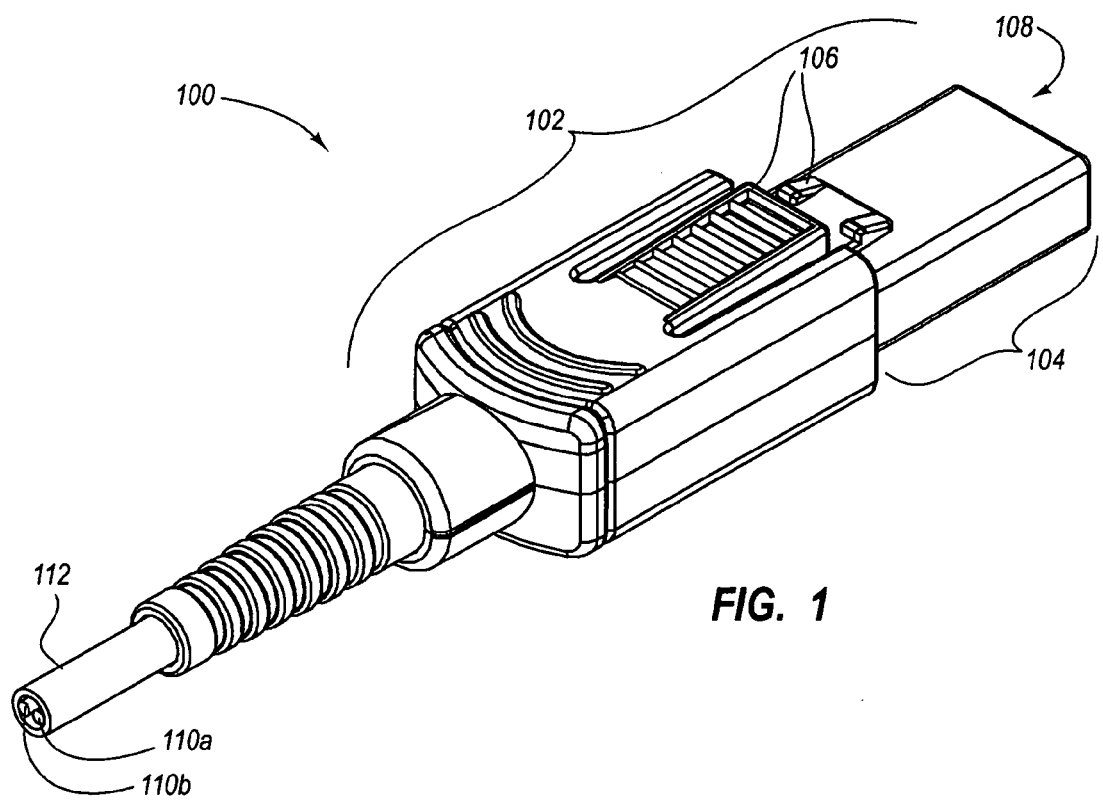
FIG. 1 illustrates one embodiment of external mechanical features of one end of an active integrated cable.

FIG. 1 is a top rear perspective view of a portion of an active integrated cable 100 that includes at least one electrical connector 102. The connector 102 includes an insertion portion 104 that may be inserted into a receptacle at a network node, whereupon a latch 106 may mechanically engage with the receptacle to lock the connector 102 into place within the receptacle until the next time the latch 106 is disengaged. The latch 106 may engage with the receptacle by simply pushing the insertion portion 104 into the receptacle, causing the latch 106 to depress downwards as the latch 106 engages the receptacle. The structure of the receptacle may permit the latch 106 to spring back up into a mechanically locked position within the receptacle once the insertion portion 104 of the connector 102 is fully inserted into the receptacle. The latch 106 may be disengaged from the receptacle by pressing downward on the latch 106, allowing the latch 106 to once again move freely out of the receptacle.

Although not visible in FIG. 1, the electrical connector 102 may additionally include an electrical interface 108 accessible through the front side of the insertion portion 104. As used herein, "front side" with respect to a connector means the insertion portion side of the connector, while "rear side" means the side of the connector closer to cable 112. "Top side" means the side of the connector that includes the latch, whereas "bottom side" means the side of the connector opposite the latch. This terminology will be consistent throughout this description when referring to a connector or a view of a connector, even if other components appear in the view.

Notwithstanding the fact that the integrated cable 100 includes an electrical connector 102 on at least one end, it may communicate over much of its length using optical signals. This may be accomplished by including one or more transmit optical sub-assemblies (TOSAs), one or more receive optical subassemblies (ROSAs), or both, within the at least one electrical connector 102. To this end, the integrated cable 100 may additionally include one or more optical fibers 110, illustrated in FIG. 1 as optical fibers 110a and 110b. The optical fibers 110 may be surrounded by a protective coating or sheath 112 that optionally includes a strength member such as Kevlar yarn. The sheath 112 and one or more optical fibers 110 may be collectively referred to herein as a fiber optic cable. Further, connectors and other devices (such as optical transceivers and optical transponders) which include at least one TOSA and/or ROSA may be generically referred to herein as optoelectronic devices, as such devices include both optical and electrical components.

Figure 2:
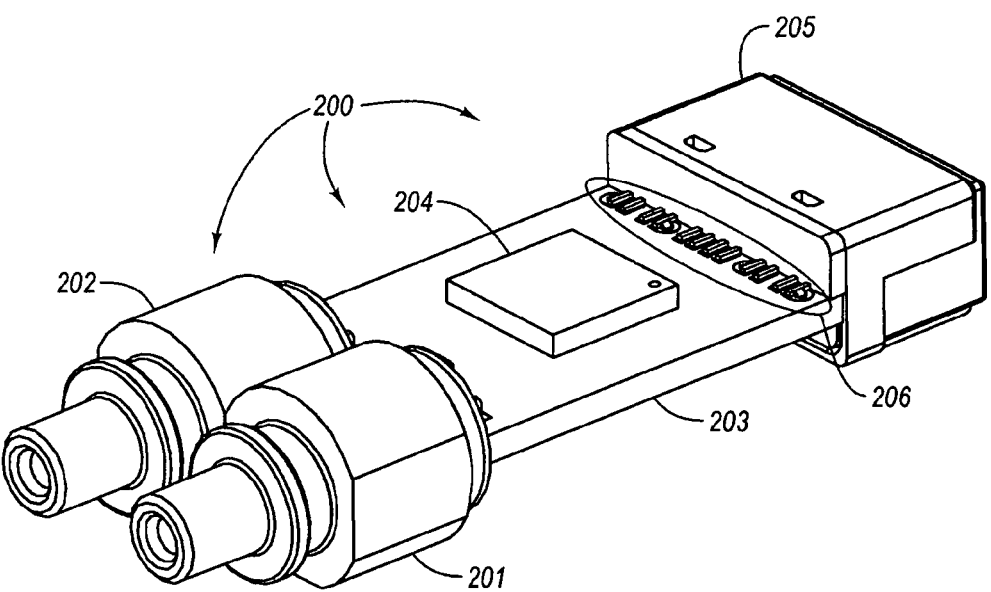
FIG. 2 illustrates one embodiment of internal mechanical features of an electrical connector that may be included within the active integrated cable of FIG. 1.

FIG. 2 illustrates a top rear perspective view of several internal components 200 of an electrical connector that may correspond to the electrical connector 102 of FIG. 1. The internal components 200 include a printed circuit board (PCB) 203 having mounted thereon one or more integrated circuits (ICs) 204 which may include electrical processing circuitry. The one or more ICs 204 may include any circuit advantageous or useful in converting electrical signals into optical signals and vice-versa. For instance, the one or more ICs 204 may include a laser driver, post amplifier, limiting amplifier, trans-impedance amplifier, controller, or any other desirable circuitry. The PCB 203 may be configured to communicate electrical signals to TOSA 201 that includes an optical transmitter configured to convert such electrical signals into an optical transmit signal for transmission over an optical fiber. ROSA 202 may include an optical receiver configured to convert optical signals received from an optical fiber into electrical signals. The PCB 203 may communicate such electrical signals to the IC 204. The PCB 203 may also communicate electrical signals to and from electrical contacts 206 in electrical interface assembly 205. The electrical contacts 206 may be configured to mechanically and electrically interface with the receptacle when the connector is plugged into the receptacle, and may be segmented into two or more groups in one embodiment, as described below.

The principles of the present invention are not limited to the use of an IC on a connector PCB, but contemplate usage in embodiments in which a single die package is used both as the structural support for the electrical circuitry as well as structure support for the TOSA and ROSA.

Optionally, the internal components 200 may include a Light Emitting Diode (LED) fixed on the bottom side (or elsewhere) of the PCB 203. The LED may be used as a light source to communicate status information to a user. In this embodiment, the electrical connector may additionally include an optical light guide (not shown) to channel light from the LED to the exterior of the connector.

Figure 3:
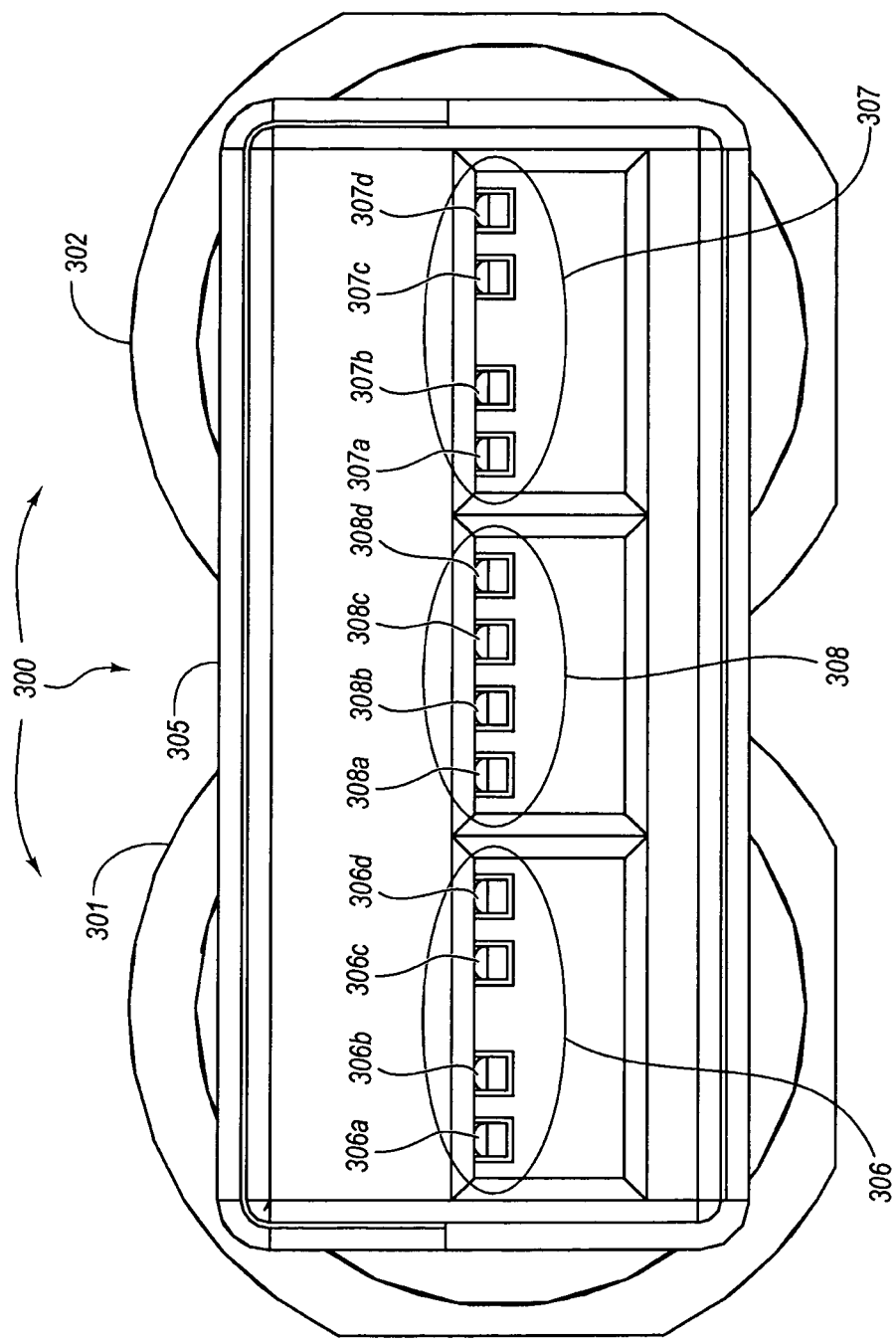
FIG. 3 illustrates one embodiment of the electrical contacts of the electrical connector of FIG. 2.

Turning now to FIG. 3, a front side view of several internal components 300 of an electrical connector are illustrated. The internal components 300 of FIG. 3 may correspond to the internal components 200 of FIG. 2 and may be implemented in the electrical connector 102 of FIG. 1. Similar to the internal components 200 of FIG. 2, the internal components 300 include a TOSA 301, ROSA 302, PCB (not visible), one or more ICs (not visible), electrical interface assembly 305, and electrical contacts segmented in several groups. For instance, the electrical contacts include contact group 306 including four contacts total (e.g., contacts 306a-306d), contact group 307 including four contacts total (e.g., contacts 307a-307d), and contact group 308 including four contacts total (e.g., contacts 308a-308d).

Each contact group 306-308 may be separated from other groups by a particular distance. For instance, there may be a relatively larger gap between contacts 306d and 308a, and between contacts 308d and 307a. Although the principles of the present invention are not limited to the grouping of such electrical contacts, this grouping can result in reduced EMI emissions of the connector, as explained more fully in U.S. Provisional Patent Application Ser. No. 60/972,725, entitled ELECTRICAL CONNECTOR USING FIBER OPTICS AND ASSOCIATED RECEPTACLES, filed Sep. 14, 2007, which application is herein incorporated by reference in its entirety. The foregoing patent application may be referred to herein as the '725 application. Furthermore, although the connector is shown as including 12 contacts, divided into three groups of four, the principles of the present invention are not limited to a particular number of contacts, or to a connector having a particular grouping of contacts.

In one embodiment, the contact group 306 may be used for communicating differential electrical transmit signals (sometimes referred to in the art as TX+ and TX− signals) and may also include two ground signals for improved signal quality. For instance, contacts 306a and 306d may be ground contacts, whereas contacts 306b and 306c may be TX+ and TX− contacts actually carrying the differential electrical transmit signal during operation. By controlling the distance between the differential transmit contacts 306b and 306c, and between each differential transmit contact and the neighboring ground contact 306a or 306d, the common mode impedance and differential mode impedance of the electrical transmit signal may be more closely controlled.

The contact group 307 may be used for communicating differential electrical receive signals (sometimes referred to as RX+ and RX− signals) and also may include two ground signals for improved signal quality. For instance, contacts 307a and 307d may be ground contacts, whereas contacts 307b and 307c may be RX+ and RX− contacts actually carrying the differential electrical receive signal during operation. Once again, by controlling the distance between the differential receive contacts 307b and 307c, and between each differential receive contact and the neighboring ground contact 307a or 307d, the common mode impedance and differential mode impedance of the electrical receive signal may also be more closely controlled. Such common mode and differential mode impedance control serves to reduce signal degradation contributed by the contacts, which may be especially important at high data rates.

The contact group 308 may have contacts that serve purposes other than actually carrying the high speed electrical signal. For instance, the contacts 308 may be used to power the one or more ICs and optional LED, may carry far-side power for providing power through the cable itself (if there is an electrical conductor also in the cable), may be used for a low speed serial interface (one wire or perhaps two wire), or any other desired purpose. One of the contacts in the contact group 308 might be used to accomplish a connector presence detection function. For example, one of the contacts may be grounded, whereas the corresponding contact in the receptacle is pulled high. If the connector is plugged into the receptacle, the receptacle contact will then be drawn low, allowing the receptacle, and any connected host, to identify that the connector is present.

That said, the specific contact configuration of FIG. 3 is only an example, and should not be read as limiting the broader scope of the principles of the present invention. The principles of the present invention are not limited to this particular construction whatsoever. Neither are they limited to use in a connector of an integrated cable that is bi-directional. Rather, the principles may be applied to a connector of an integrated cable that serves only as a receiver, or only as a transmitter. Furthermore, the principles of the present invention may apply regardless of the number of transmit channels (zero or more), and regardless of the number of receive channels (zero or more).

The contacts 306-308 may be structurally supported by an overmolded body. The body may be composed of a structurally rigid, but electrically insulative material, such as plastic. This allows the contact groups 306-308 to be structurally supported, while preventing the contacts from shorting to each other. The electrical interface assembly 300 may additionally include a housing composed of a material that serves as an electrical insulator, such as plastic. Further details regarding an electrical connector that may be included on one or both ends of an integrated cable are described in greater detail in the '725 application.

Returning to FIG. 1, only one end of the integrated cable 100 is illustrated. As previously indicated, the other end of the integrated cable 100 may be terminated by a second electrical connector—similar to the electrical connector 102 of FIG. 1—as described below with respect to FIG. 4. Alternately, the other end of the integrated cable 100 may be terminated by an optical connector as described below with respect to FIG. 5.

Figure 4:
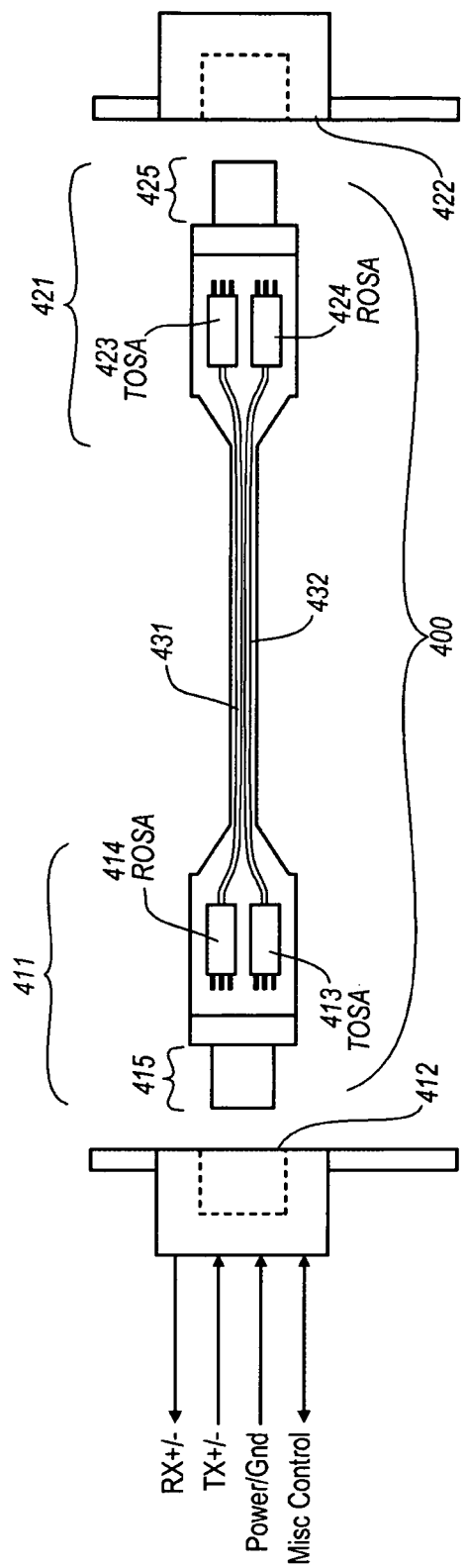
FIG. 4 schematically illustrates internal features of a fully duplex electrical-to-electrical integrated cable.

For instance, FIG. 4 schematically illustrates one embodiment of an integrated cable 400 that has electrical connectors 411 and 421 at both ends. The integrated cable 400 and each of the electrical connectors 411, 412 may correspond to the integrated cable and electrical connector described above with respect to FIGS. 1-3. As a preliminary note, the integrated cable 400 is not drawn to scale. Furthermore, some of the components are illustrated abstractly and are not necessarily the shape illustrated. Thus, although the integrated cable 400 is not the same dimensions as the integrated cable 100 of FIG. 1, the integrated cable 400 helps illustrate various aspects and features of embodiments of an integrated cable such as the integrated cable 100.

Each electrical connector 411, 421 includes an insertion portion 415, 425 sized and configured to be received by a corresponding receptacle at a network node. For example, insertion portion 415 is configured to be received by receptacle 412 at one network node, while the insertion portion 425 is configured to be received by receptacle 422 at another network node. From the external connection viewpoint, it is as though the cable 400 is entirely an electrical cable.

However, upon closer examination of the integrated cable 400 of FIG. 4, communication over at least part of the cable length is actually accomplished via optical fibers. Each end of the cable 400 may include optics that support simplex- or duplex-mode optical communications. In the present embodiment, the optics support duplex-mode communications and may include, at each end of the cable 400, a TOSA for transmission of an optical signal over one optical fiber and a ROSA for receipt of an optical signal from another optical fiber. One or more ICs to drive the transmitting optics and to receive the detected signal are included. These ICs may be outside the TOSA or ROSA on a PCB as described above, or may be integrated directly in the design of the TOSA or ROSA. Though the cable 400 is illustrated as supporting duplex-mode in which optical communication occurs in either direction, the cable may also perform communication in one direction consisting of a single transmitter at one end and a single receiver at the other. When communicating in one direction, a unidirectional optical channel is implemented consisting of a TOSA, a ROSA and an optical medium coupled between the TOSA and the ROSA. A bidirectional optical channel (implemented in duplex-mode) consists of two unidirectional optical channels, one for each direction of communication between the two endpoints of the optical channel.

Referring in further detail to FIG. 4, the cable 400 includes two optical fibers 431 and 432 integrated within the cable 400. When an electrical signal is applied to the appropriate connections of the electrical connector 421 (e.g., through the electrical port/receptacle 422), those electrical signals are converted by a laser driver and TOSA 423 (or more specifically by an electro-optical transducer within the TOSA 423) to a corresponding optical signal. As noted, the laser driver may be included within the TOSA. The optical signal is transmitted over optical fiber 431 to ROSA 414. The ROSA 414 (or more specifically, an opto-electrical transducer within the ROSA 414) converts the optical signal received from the optical fiber 431 into a corresponding electrical signal. Typically the opto-electrical transducer may consist of a PIN detector and a preamplifier IC, usually with a transimpedance amplifier front-end design. A limiting amplifier may also be integrated with the preamplifier or provided separately. The electrical signal is applied on the appropriate connections of the electrical connector 411, whereupon it is provided to the electrical port 412. While the cable 400 may be of any length, in various embodiments it is approximately 1 to 100 meters long from end to end. The cable may support high speed communication ranging between 1 to 10 gigabits per second and beyond.

If the principles of the present invention are to be applied to bi-directional communication, when an electrical signal is applied to the appropriate connections of the electrical connector 411 (e.g., through the electrical port/receptacle 412), those electrical signals are converted by a laser driver and TOSA 413 (or more specifically by an electro-optical transducer within the TOSA 413) to a corresponding optical signal. Once again, the laser driver may (but need not) be integrated within the TOSA. The optical signal is transmitted over optical fiber 432 to ROSA 424. The ROSA 424 (or more specifically, an opto-electrical transducer within the ROSA 424) converts the optical signal received from the optical fiber 432 into a corresponding electrical signal. The electrical signal is applied on the appropriate connections of the electrical connector 421, whereupon it is provided to the electrical port/receptacle 422. Although not shown, the cable 400 may optionally include a protective coating.

In principle, any type of optical fiber (single mode or multimode) could be used with the appropriate TOSA and ROSA designs. The optical fiber selected may depend on the link distance and/or the optical transmitter. For example, for shortwave VCSEL (~850 nm) sources, the use of multimode fiber for links of 100 m and less may be desirable. In particular, a multimode fiber generically referred to as OM2 which has a core and cladding diameter of about 50 and 125 microns, respectively, and a minimum overfilled (OFL) bandwidth of about 500 MHz·km may be used in connections up to about 30 meters in length. For links longer than about 30 meters, a class of fiber generally known as OM3 having a tighter tolerance on the core design but with identical mechanical dimensions and which has a minimum OFL of 2000 MHz·km may be used to a distance of 100 meters or more. Alternately or additionally, other types of single mode or multi mode fiber may be implemented at shorter or longer distances than those described above. Further, those skilled in the arts will recognize that the distance at which to use a certain type of fiber will be determined by many factors and may result in a tradeoff point significantly different than 30 meters.

Of course, the opto-electronic conversion process and the electro-optic conversion process require power in order to convert between optical and electrical energy. Thus, the electrical connectors supply power from the host at least one end of the cable 400 to power the opto-electronic and/or electro-optic conversion. The power connection may be, for example, a 3.3 volt power connection. In FIG. 4, for example, the electrical port 412 is illustrated as supplying Power/Gnd connections for conveying electrical power from the host to electrical connector 411.

Thus, conveyance of information is accomplished largely by means of an optical signal, while providing electrical connections on both ends of the cable. The purchaser of the cable need not even be aware that the cable is an optical cable. In fact, a copper cable could be provided for particularly short links (perhaps 1 to 5 meters) which emulates the cable 400 of FIG. 4.

While a single cable assembly linking two pieces of equipment is probably the simplest and lowest cost configuration in terms of hardware and perhaps preferred for shorter links (for example, less than 10 meters), it may prove inconvenient to install for longer connections (for example, more than 30 meters). For longer distances, connections of multiple cables may be more convenient. In conventional optical links, for example, it is common for a longer length of cable to be terminated at each end at a patch panel consisting of one or more cable plug end connectors. A short connection is made from the optical ports on network equipment at each end of the link to the corresponding patch panel using a relatively short (from 1 to 5 meter) patch cable. In other cases, even more complicated connections are used involving as many as 4 to 6 connections.

While some embodiments of potential applications of the present invention could be served by a single cable, variations which would allow the connection of at least three cables may be of great utility. There are several possible methods by which the present cable may be interconnected to other such cables or other variants to be described, all of which being encompassed within the principles of the present invention. The various embodiments have different relative advantages.

Figure 5:
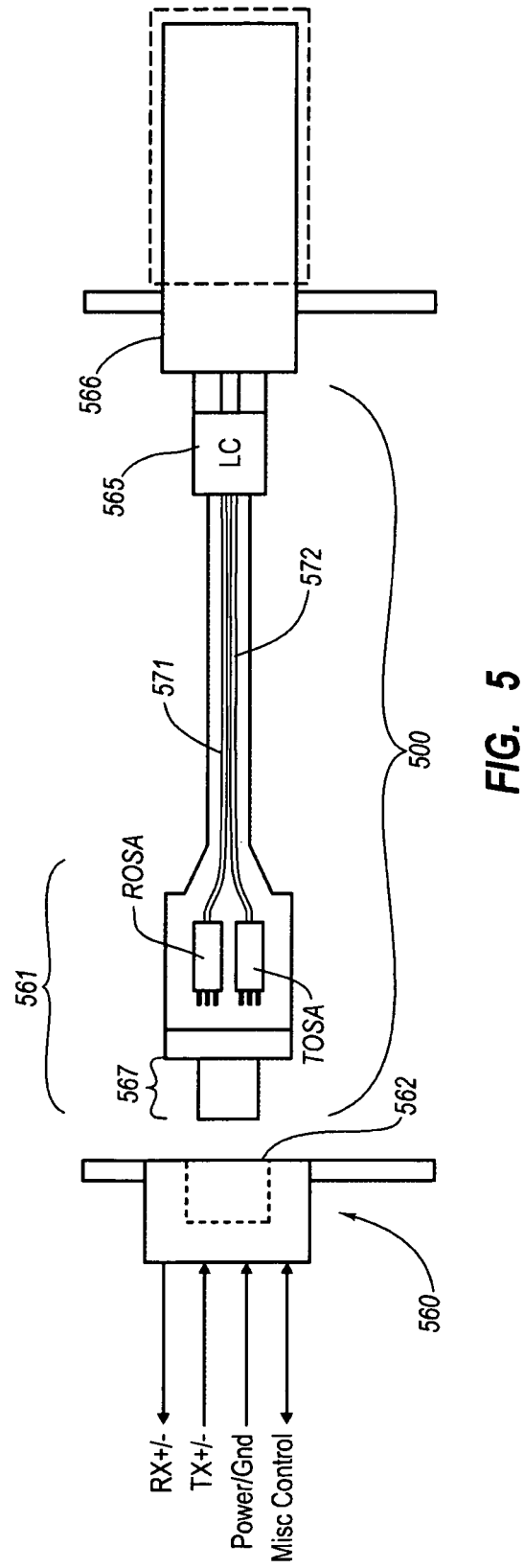
FIG. 5 schematically illustrates an electrical-to-optical integrated cable in which the optical end is coupled to an external optical transceiver or transponder.

FIG. 5 abstractly illustrates an integrated cable 500 in accordance with another embodiment of the invention. The integrated cable 500 and electrical connector 561 may correspond to the integrated cable and electrical connector described above with respect to FIGS. 1-3. Further, the integrated cable 500 of FIG. 5 is similar to the integrated cable 400 of FIG. 4, except that the integrated cable 500 has an electrical connector 561 on only one end of the cable for connection with the electrical port/receptacle 562, and an optical connector 565 on the other end of the cable. The optical connector 565 is configured to permit the cable to receive optical signals from an optical transceiver or transponder 566 through optical fiber 571 using connector 565, and transmit optical signals from optical fiber 572 to the optical transceiver 566 also using connector 565. Alternately, the optical connector 565 may permit the cable to receive and transmit optical signals to and from other optical fibers.

In the illustrated embodiment of FIG. 5, the optical connector 565 is illustrated as a standard LC optical connector (see ANSI/TIA/EIA 604-10. "FOCIS-10 Fiber Optic Connector Intermateability Standard" 10/99 for more information concerning the standard LC optical connector). However, any optical connection may suffice, including, but not limited to, SC optical connectors (see IEC61754-4 "Fiber optic connector interface Part 4: Type SC connector family" Ed 1.2, 2002-2003 for more information concerning the standard SC optical connector), as well as other optical connectors. While the cable 500 may be of any length, in one embodiment, the length is from 1 to 5 meters. The cable illustrated in FIG. 5 may be referred to as an electrical to optical cable, optical to electrical cable, or simply as an "E-O" cable.

The E-O integrated cable 500 could have specifications on the optical input and output such as the minimum and maximum transmitted modulated power and the minimum and maximum acceptable receive power. These could either be custom specifications to enable a particular range of links with given fiber types or specifications complying with one or more existing or future optical standards for multimode or single mode fiber connections. One example would be the IEEE 10G BASE-SR standard which allows transmission of up to 300 meters on some grades of multimode optical fiber.

With continued reference to FIG. 5, one end of the E-O cable 500 (e.g., the end having the electrical connector 561) is connected to a first piece of network equipment 560 by inserting an insertion portion 367 of the electrical connector 361 into an electrical port/receptacle 562. The optical connector end of the E-O cable 500 may be configured as an optical connector that is connected to the optical transceiver 566, which has an electrical interface with a second piece of network equipment. Thus, in one embodiment, the E-O cable 500 may interoperate with existing optical transceivers such as, for example, SFP optical transceivers (see Small Form-factor Pluggable (SFP) Transceiver Multi-source Agreement (MSA), Sep. 14, 2000. Also, TNF-8074i Specification for SFP Rev 1.0 May 12, 2001), XFP (see http://www.xfpm-sa.org/XFP_SFF_INF_8077i_Rev4_0.pdf), XENPAK (see http://www.xenpak.org/MSA/XENPAK_MSA_R3.0.pdf), X2 (see http://www.x2msa.org/X2_MSA_Rev2.0b.pdf) or XPAK transceivers, as long as the cable 500 followed a consistent set of optical specifications suitable for the transceiver type. The configuration shown in FIG. 5 could also include one or more lengths of optical fiber with standard connectors, with the number determined by the optical link budget to which the E-O cable 500 and optical transceiver 566 comply.

Cables in accordance with the principles of the present invention may also include additional functionality. For instance, the cables 100, 400, 500 may include a mechanism for confirming whether or not a full duplex connection is present (e.g., by transmitting and receiving a relatively lower optical power level within IEC Class 1 eye safety limits over either or both of the first optical fiber and the second optical fiber), a mechanism to reduce or shut-off optical power whenever a full duplex connection is not confirmed, and/or a mechanism to keep the optical power reduced or off until the presence of a full duplex connection is verified.

The electrical connectors 102, 411, 421, 561 may include connections for a loss of signal (LOS) indication, a fault indication, a link disable control signal, presence indication of the integrated cable to a host system that is associated with the first or even second electrical port, an interrupt signal, a reference clock input, low speed serial data interfaces and/or any other connections for control of the cable.

The low speed serial data interface may be configured for use in control of the first electro-optical transducer, may be part of a system for the transmission of out of band data, may be configured to read or write data to nonvolatile memory in the optics portion of the cable, and/or may be used for one or more functions such as serial identifier codes, customer security codes, or the like. Customer security codes could be provided to specifically allow only host qualified implementations of the cable and to detect outright counterfeit parts. Diagnostic information, which may be dynamically updated in volatile memory, could be provided over the same serial interface. The serial interface may also be used for factory setup of the device to load non-volatile data to an internal EEPROM, FLASH memory or set of fusible links in the laser driver and/or receiver IC. The serial interface may be any serial interface, such as SPI, I²C, MDIO, or the like.

As indicated above, integrated cables according to embodiments of the invention may include at least one electrical conductor spanning the length of the integrated cable. This electrical conductor may be used to transmit electrical power from one end of the cable to the other end of the cable. However, alternatively or in addition, there may be electrical conductors for transmitting low speed serial data from one end of the integrated cable to the other end of the integrated cable. Furthermore, the cables included for transmitting electrical power may be simultaneously used for transmission of low speed serial data.

Thus, the user need not be concerned about choosing whether copper-based solutions or optical solutions are more appropriate, and then choose to configure the system with the appropriate ports. Instead, the user may just plug in the cable, and enjoy all of the benefits of optical communication such as, for example, high bandwidth communication with low power consumption and high port density, and with less pre-processing and post-processing of information. Alternatively, the user could choose a copper based version of the cable for particularly short links (say from the top to the bottom of a rack of switching equipment) if economically advantageous.

A useful variation of these optical link cables with electrical interface is the possibility of carrying more than one bidirectional signal in a single cable. In particular, the size of the optical subassemblies, the low power dissipation possible and the density of pinout may allow the relatively easy implementation of two links within a connector width of approximately less than one half inch, or roughly the size of the very common RJ-45 network connector.

Figure 6:
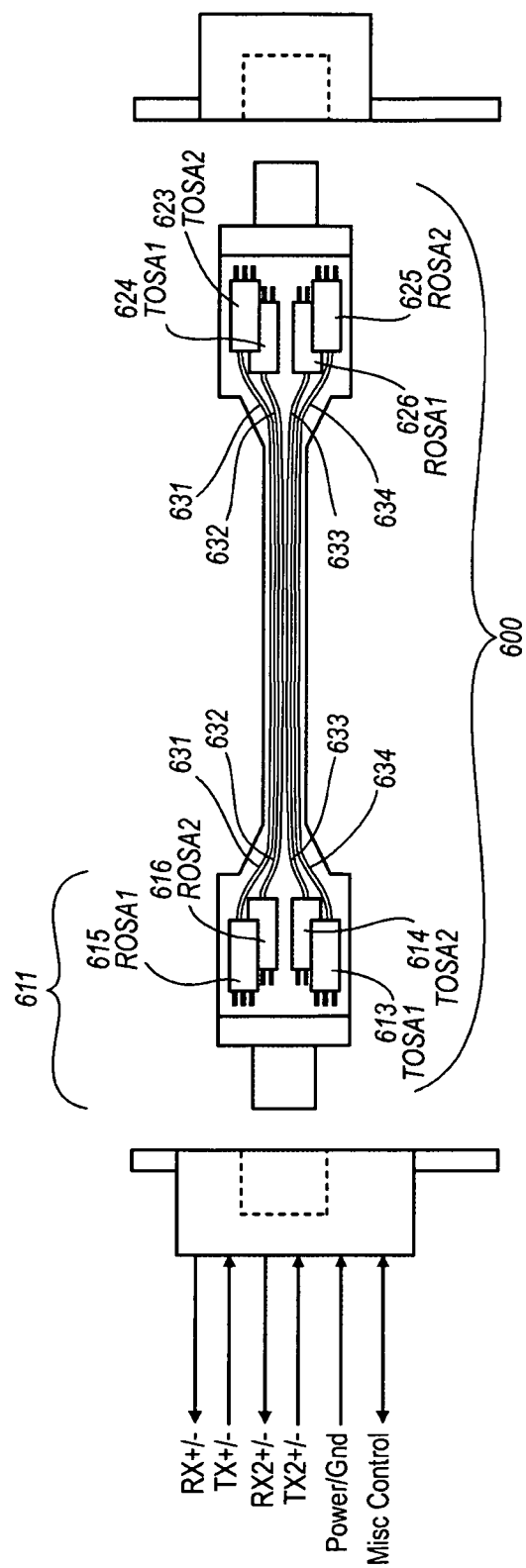
FIG. 6 schematically illustrates a dual link electrical-to-electrical optical cable.

For example, as shown in FIG. 6, electrical connector 611 is defined with two sets of differential input and outputs (e.g., RX, RX2, TX and TX2) each representing independent bidirectional links, and the connector 611 may then contain two TOSAs 613, 614 and two ROSAs 615, 616, which in turn are connected to 4 separate optical fibers 631-634. Alternatively, the two channels may be integrated in a single TOSA with a dual-channel laser driver and two VCSELS, either discrete or on the same subassembly. It will be apparent to one skilled in the art after having read this description that the principle of having two (or more) channels in a cable may be applied to all the variants of the cables described above as well as to the various means of interconnecting cables directly or through a separate adapter. Two TOSAs 623, 624 and two ROSAs 625, 626 may be included in the other end of the cable as well, thus establishing a dual link duplex integrated cable 600. It should be clear that implementations with more than 2 links in a single assembly are also possible.

Finally, there are a number of characteristics of the electrical connector system which may be favorable for the integrated cables described herein. First, there might be a latching mechanism, such as the latch 106 of FIG. 1, the tab style latch found in an RJ-45 style connector or a push-pull style latch employed in the SC style fiber optic connector, or the like or any combination thereof.

Second, the receptacle on the host system may include provisions for visual indicators of link activity and other status. This may be accomplished by two means common in the RJ-45 connector system. The first is inclusion of LEDs in the front panel face of the host receptacle with electrical connections to the host PCB. A second method is to include plastic light pipes within the receptacle assembly to guide light from LEDs on the host PCB to the front surface of the receptacle, as described above with respect to FIG. 2.

Third, the integrated cables may have a provision for some sort of keying system to allow or prevent different types of host systems from being interconnected. One example where a keying system would be important is to prevent the insertion of a single link cable in a dual link port. Another example would be the prevention of the connection of two host systems running different protocols, though this could be detected by protocol means themselves. For example, exactly the same cable may be useful for Ethernet and Fiber Channel applications, yet a system's administrator running a datacenter with both types of equipment may wish to prevent the interconnection of these systems by simple mechanical means. Color coding or other simple means could be used for this purpose as well. Keying features on a connector often comprise a mechanical protrusion on one of a set of locations on the host receptacle and corresponding slots on the cable plug, or vice versa. Examples of these features can be found in the definition of the HSSDC2 connector (see Small Form Factor Committee document SFF-8421 rev 2.6, Oct. 17, 2005).

There are many possible choices for the electrical connector(s) of the integrated cables described herein in terms of the number of pins, their function and their relative arrangement. One example embodiment of a pinout for an electrical connector has already been described above with respect to FIG. 3, although other embodiments are also possible.

Embodiments of the external mechanical configuration for at least one end of an integrated cable have been described above with respect to FIG. 1. Additionally, embodiments of the internal mechanical and electrical configuration for an electrical connector that can be implemented at one or both ends of an integrated cable have been described with respect to FIGS. 2 and 3. Further, various functional components of different integrated cable embodiments have been abstractly illustrated and described with respect to FIGS. 4-6. To further aid in understanding embodiments of the invention, functional components of an electrical connector that can be implemented in an integrated cable are illustrated in FIG. 7 and will now be described.

Figure 7:
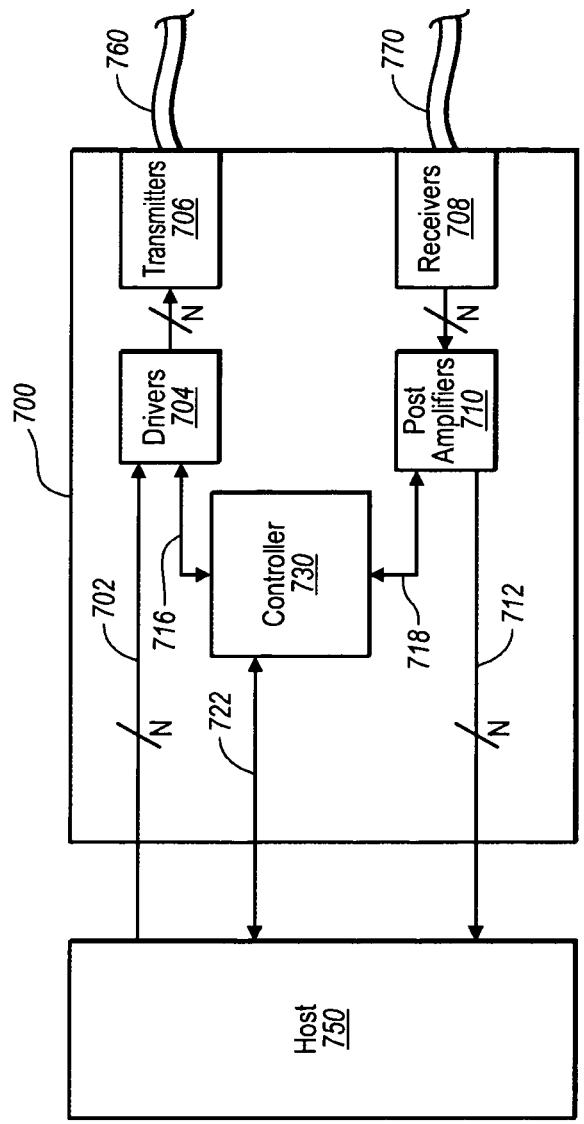
FIG. 7 schematically illustrates an example configuration of an electrical connector, transceiver, or transponder, according to embodiments of the invention.

FIG. 7 schematically illustrates a possible configuration 700 of some of the functional electrical and optical components that may be included in an electrical connector employed at one or both ends of any of the integrated cables described above, and may be referred to herein as electrical connector 700. Whereas the configuration 700 includes both optical and electrical components, it may also be referred to herein as optoelectronic device 700 and may additionally correspond to the transceiver or transponder 566 of FIG. 5.

The electrical connector 700 includes "N" bidirectional optical channels, "N" being as few as one and up to any number desirable. For example, the electrical connectors of FIGS. 1-5 include one bidirectional optical channel (e.g., one optical transmit channel and one optical receive channel) while the electrical connectors of FIG. 6 each include two bidirectional optical channels (e.g., two optical transmit channels and two optical receive channels).

The electrical connector 700 includes N drivers 704, N post amplifiers 710, and a controller 730, that may correspond to the electrical processing circuitry implemented in the one or more ICs 204 of FIG. 2. The electrical connector 700 additionally includes N transmitters 706 and N receivers 708 that may correspond to the TOSAs and ROSAs, respectively, of FIGS. 1-6.

To facilitate various features, such as the ability to safely operate above eye safety limits and/or to interoperate with other devices, status data indicating the status of the "N" bidirectional channels may be transmitted and received by the electrical connector 700 to and from another electrical connector or optoelectronic device at the other end of a corresponding integrated cable in which the electrical connector 700 is implemented. The status data may be conveyed by itself or simultaneously with primary data. As used herein, the term "primary data" refers to data such as customer data, voice data or computer data that does not control or provide information regarding the operation or status of the "N" bidirectional optical channels. Primary data may be conveyed over one or more main communication links. "Status data" refers to data other than primary data, that provides information regarding or controls the operation or status of the "N" bidirectional optical channels. Status data may be conveyed over a status link and can be used to improve the quality of the main communication links.

During operation, the electrical connector 700 can receive "N" data-carrying electrical signals 702 from a piece of network equipment such as a host 750 or other computing system for transmission as "N" data-carrying optical signals on to the optical fiber(s) 760. The "N" electrical signals may each carry primary data, each signal comprising a differential signal pair. Although not shown, the electrical connector 700 and host 750 may be electrically and/or mechanically coupled using, for example, an insertion member of the electrical connector 700, which may be plugged into a corresponding receptacle of the host 750, as described above.

As previously described above, each electrical data signal (e.g., each differential signal pair) may be provided to a laser driver 704, which then provides a primary data modulation signal to a corresponding optical transmitter 706. Each optical transmitter 706 acts as an electro-optical transducer, emitting a data-carrying optical signal representative of the information carried on the electrical data signal. Further, each optical transmitter 706 may comprise a light source having any suitable configuration, including, but not limited to, a distributed feedback (DFB) laser, a vertical cavity surface emitting laser (VCSEL), a cooled or uncooled externally modulated laser (EML), an EML with a wavelocker, a Fabry-Perot laser, a light emitting diode, or the like.

The electrical connector 700 is also configured to receive "N" data-carrying optical signals from optical fiber(s) 770 using "N" optical receivers 708. Each of the optical receivers 708 may comprise a photodetector such as a photodiode, an avalanche photodiode (APD), a positive-negative-intrinsic photodiode (PIN), or the like. The receivers 708 act as optoelectrical transducers by transforming optical signals into electrical signals. "N" post-amplifers 710 amplify the electrical signals and provide "N" amplified signals 712 to the host 750. In one embodiment of the invention, each of the "N" electrical signals may actually comprise a differential signal pair.

The behavior of the drivers 704 and post amplifiers 710 may vary dynamically due to a number of factors. For example, temperature changes, power fluctuations, feedback conditions, and aging effects may each affect the performance of these components. Accordingly, the electrical connector 700 further includes controller 730, which can evaluate conditions pertinent to device operation, such as temperature, voltage or bias current, and receive information from the drivers 704 and post amplifiers 710, represented by arrows 716 and 718, respectively. This allows the controller 730 to optimize the dynamically varying performance, and additionally detect when there is a loss of signal. Specifically, the controller 730 may optimize the operation of the connector 700 by adjusting settings on each of the drivers 704 and/or post amplifiers 710 individually. These settings adjustments can be intermittent and are generally only made when temperature or voltage or other low frequency changes so warrant. According to one embodiment, these adjustments may occur in response to status data or an absence of status data received from an optoelectronic device—such as a transceiver or connector—on the other end of an optical link established over the integrated cable with electrical connector 700.

Alternately or additionally, the controller 730 may be configured to transition operation of the N transmitters 706 between a low transmit power mode and a normal transmit power mode depending on potential eye exposure to emitted optical signals. In low transmit power mode, the aggregate optical output power of the N transmitters 706 may be at or below a particular eye safety limit. In normal transmit power mode, the aggregate optical output power of the N transmitters 706 may be above the eye safety limit. In one embodiment, transitioning between low and normal transmit power modes may include the controller 730 adjusting the transmitter bias currents of the transmitters 706, described in greater detail below. These transitions may occur in response to status data received from a second optoelectronic device.

The controller 730 may have access to a persistent memory, which in one embodiment is an electrically erasable programmable read-only memory (EEPROM). Persistent memory may also be any other nonvolatile memory source. The persistent memory and the controller 730 may be packaged together in the same package or in different packages without restriction. As mentioned above, data may be exchanged between a controller 730 and host 750 using an appropriate interface 722.

The controller 730 senses and retrieves data relating to the operation of the connector 700. In particular, the controller is configured to sense and retrieve data relating to the "N" bidirectional channels of the device 700. For instance, the controller may retrieve digital values for the transmitter bias currents for each of the "N" transmitters. The digital values for the "N" transmitters may be supplied to "N" digital to analog converters (DACs) which use the digital values to generate analog transmitter bias currents for the "N" transmitters. The controller 730 may also detect the receiver bias current in each of the "N" receivers to monitor the status of the "N" receive channels.

Figure 8:
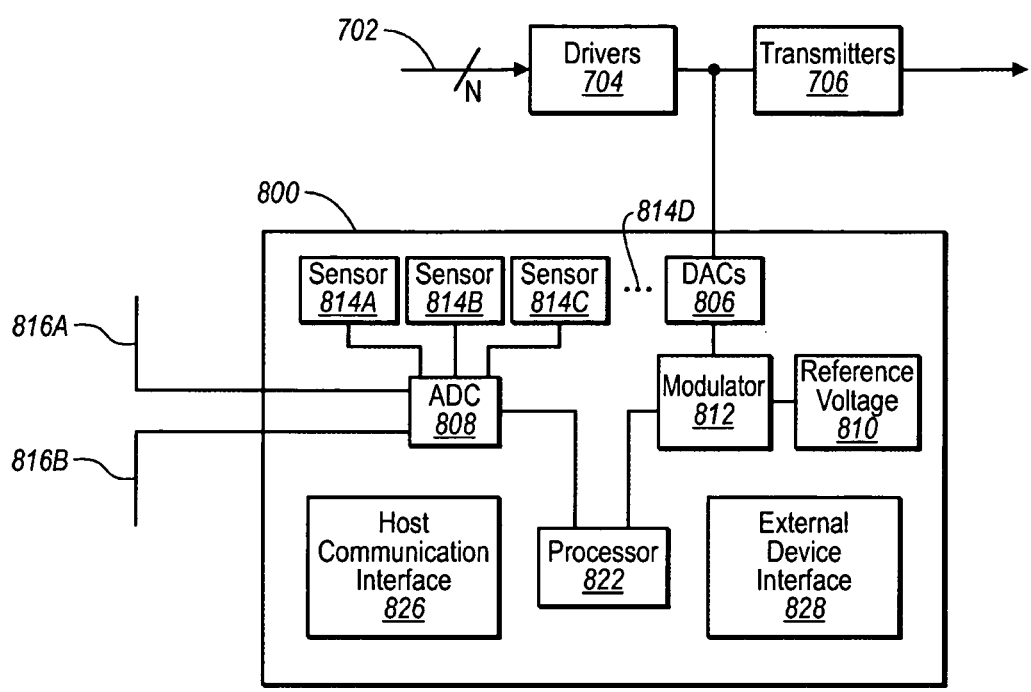
FIG. 8 schematically illustrates an example controller that may be used in the configuration of FIG. 7.

Turning now to FIG. 8, various functional components of a controller 800 are illustrated. The controller 800 may correspond to the controller 730 of FIG. 7. The controller 800 contains digital to analog converters (DACs) 806, analog to digital converters (ADCs) 808, a voltage reference 810, a modulator 812, and a processor 822. The controller 800 may also include sensors 814A, 814B, 814C amongst potentially others as represented by the horizontal ellipses 814D. Each of these sensors may be responsible for measuring diagnostic data including environmental and/or operational parameters such as, for example supply voltage and transceiver temperature. The controller 800 may also receive external analog or digital signals from other components within the transceiver.

Two externals lines 816A and 816B are illustrated for receiving such external analog signals although there may be many of such lines. For instance, in one embodiment "N" external lines like 816A and 816B can receive external analog signals from the "N" receivers 708, the external analog signals representing the receiver bias current in each of the receivers.

The internal sensors 814A through 814D may generate analog signals that represent the measured values. In addition, the externally provided signals 816A, 816B may also be analog signals. In this case, the analog signals may be converted by ADCs 808 to digital signals so as to be available to the processor 822 for further processing. Each analog parameter value may have its own ADC, or a single ADC can be used in conjunction with a multiplexer that periodically samples each of the analog signals.

The processor 822 may recognize instructions that follow a particular instruction set, and may perform normal general-purpose operation such as shifting, branching, adding, subtracting, multiplying, dividing, Boolean operations, comparison operations, and the like. In one embodiment, the processor 822 is a 16-bit general-purpose processor. The precise structure of the instruction set is not important to the principles of the present invention as the instruction set may be optimized around a particular hardware environment, and as the precise hardware environment is not important to the principles of the present invention.

A host communication interface 826 may be provided to communicate with the host using, for example, serial data (SDA) and serial clock (SCL) lines of an I²C interface, although other interfaces may also be used. An external device interface 828 may be provided for communicating with other modules within the device 800 such as the post-amplifiers 710 and the laser drivers 704 of FIG. 7.

When the two ends of an optical link—whether implemented as electrical connectors or optoelectronic transceivers or transponders—are both configured similar to the optoelectronic device 700 of FIG. 7, the two ends can establish a bidirectional status link over one or more bidirectional channels, either by itself or in combination with one or more main communication links, permitting status data regarding the bidirectional channels to be transmitted between the two ends. For instance, a first device can establish a status link with a second device over one or more transmit channels of the first device and the second device can establish a status link with the first device over one or more transmit channels of the second device.

Having described embodiments of an electrical connector/optoelectronic device and controller that can be implemented in or with an integrated cable, and a brief overview of status links, embodiments of various methods for using status links to operate electrical connectors or optoelectronic devices above eye safety limits or for interoperating with other devices will now be described with respect to FIGS. 9-12.

Figures 9, 10:
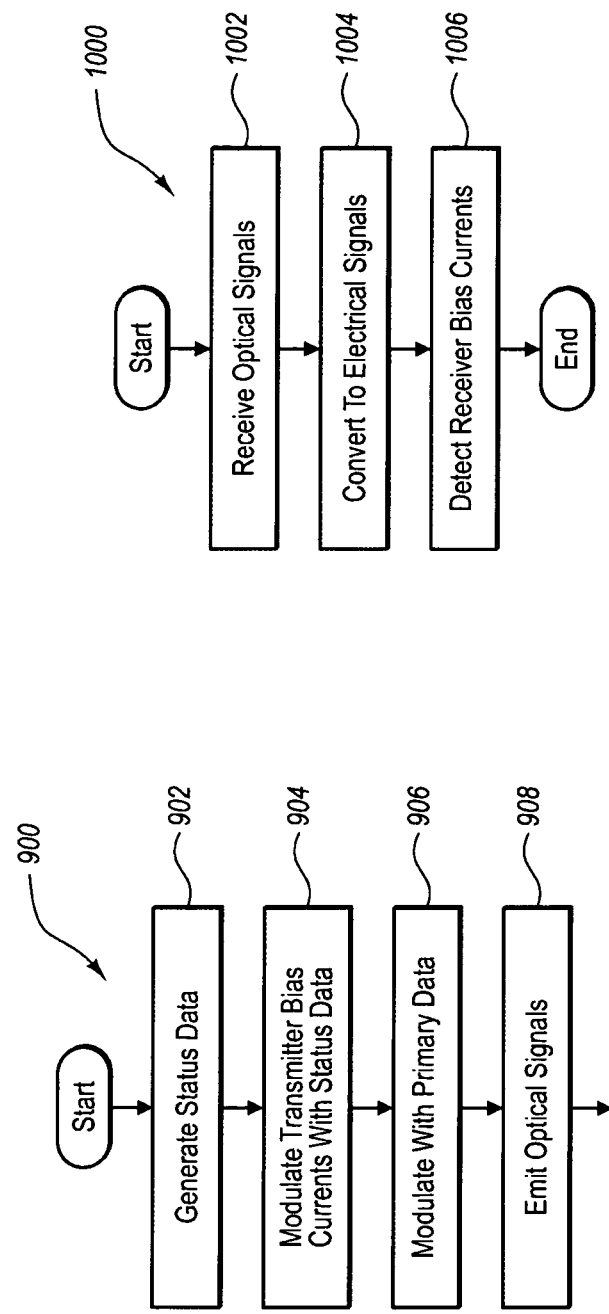
FIG. 9 illustrates a method for encoding status data in an optical signal that may be implemented in embodiments of an integrated cable.
FIG. 10 illustrates a method for detecting status data encoded in an optical signal that may be implemented in embodiments of an integrated cable.

With respect to FIG. 9, a method 900 is described for establishing and maintaining a status link between a first device and a second device on two ends of an optical link, where at least one of the devices may be included within an integrated cable. Those skilled in the art will recognize that a status link between the second device and first device may similarly be established. The establishment of both status links results in a bidirectional status link.

The process 900 may begin when a controller of the first device (e.g., a "first controller") generates 902 status data. Many times, the status data may be indicative of one or more conditions affecting the performance of the optical link between the first and second devices. For instance, in one embodiment, the first controller may determine that one of two or more main communication links with the second device is no longer working. This may be due to a failed transmitted or receiver, for instance. If unused channels are available (e.g., an unused fiber in a set of parallel ribbon fibers connecting the first and second device, or an unused wavelength in WDM applications), the first controller may generate status data instructing the second device to switch out the non-functional channel for an available functional channel. Embodiments of methods and systems for providing failure tolerance with spare channels and a status link are described in greater detail in U.S. patent application Ser. No. 12/039,589, entitled REDUNDANCY AND INTEROPERABILITY IN MULTI-CHANNEL OPTOELECTRONIC DEVICES, filed Feb. 28, 2008, which application is herein incorporated by reference in its entirety.

Alternately or additionally, the first controller may determine that the optical signal received by one (or more) of the first device's N receivers is progressively attenuating, which could compromise the integrity of the main communication link associated with the receiver in question. The signal may be progressively attenuating due to aging and/or other degradation effects in one of the N transmitters of the second device and/or in one of the corresponding optical fibers. In this case, the first controller may generate status data instructing the second device (or more particularly, instructing a controller of the second device) to adjust the transmit power of the transmitter in question to compensate for the attenuation. Embodiments of methods and systems for compensating for degradation effects are described in greater detail in U.S. patent application Ser. No. 12/039,595, entitled STATUS LINK FOR MULTI-CHANNEL OPTICAL COMMUNICATION SYSTEMS, filed Feb. 28, 2008, which application is herein incorporated by reference in its entirety.

Alternatively or additionally, the first controller may determine whether optical signals emitted by the transmitters of the first device and/or of the transmitters of the second device are potentially exposed to view. If the first controller determines that the optical signals are not potentially exposed to view (based on receiver bias currents of the N receivers 708 in one embodiment), it may generate 802 status data indicating it is safe for the second device to operate in normal transmit power mode. The first controller may continue to generate 802 status data indicating it is safe to transmit at the normal transmit power mode until it is unsafe to do so. In this embodiment, once a controller of the second device, referred to herein as the "second controller," no longer receives status data indicating it is safe to operate at the normal transmit mode, it can then transition to low transmit power mode to maintain eye safety.

Alternately or additionally, the first controller may generate default status data which is constantly sent to the second device unless other status data has been generated. While specific types of status data have been disclosed, those of skill in the art will recognize that other status data may alternately or additionally be generated as desired.

The generated status data may be communicated from the first device to the second device by effectively modulating 904 the transmitter bias current(s) for one or more of the "N" transmitters of the first device with a low frequency status link modulation signal representative of the status data. As is well known in the art, a transmitter bias current provides sufficient current for the lazing function of a transmitter. In an optoelectronic device that includes a controller such as the controller 800 of FIG. 8, a processor retrieves a digital transmitter bias current value from memory and provides it to a digital to analog converter (DAC). The DAC combines the digital transmitter bias current value with a signal from a reference voltage. The result is an analog transmitter bias current which is provided to a transmitter. When the device has multiple transmitters, there may be multiple DACs which combine multiple digital transmitter bias current values with a signal from a common reference voltage.

A transmitter bias current may be effectively modulated 904 with status data in a number of ways. According to one embodiment, status data is provided to a modulator such as the modulator 812 of FIG. 8. The modulator 812 modulates the signal supplied by the common reference voltage 810 with a status link modulation signal representative of the status data. The status-link modulated common reference voltage signal is provided to a DAC 806, which uses the digital transmitter bias current value supplied by the processor and the status-link modulated common reference voltage signal to create a status-link modulated transmitter bias current.

In another embodiment, rather than modulating the common reference voltage signal with the status link modulation signal, the processor 822 modulates a digital transmitter bias current value for a transmitter prior to providing the digital transmitter bias current value to a DAC 806. In this embodiment, the processor uses the generated status data to generate a digital status link modulation signal. Within the controller 800, the digital status link modulation signal is combined with a digital transmitter bias current value to produce a status-link modulated digital transmitter bias current value. The status-link modulated digital transmitter bias current value is provided to the DAC 806 which combines the status-link modulated digital transmitter bias current value with an un-modulated reference voltage signal to create a status-link modulated transmitter bias current. One of skill in the art will recognize that when a device has multiple bidirectional channels, the status link may be applied to more than one channel by effectively modulating more than one transmitter bias current, resulting in a redundant status link.

Various modulation techniques may be used to effectively apply the status link modulation signal to a transmitter bias current. In one embodiment, low frequency amplitude modulation may be applied. According to this embodiment, the amplitude of the transmitter bias current may be varied slightly to represent logic value ones and logic value zeros. For instance, the transmitter bias current may be slightly increased to represent a logic value one and slightly decreased to represent a logic value zero. This slight increase or decrease in transmitter bias current results in a slight increase or decrease in average transmit power of an emitted optical signal, which may be detected to extract the status data. Other modulation techniques may alternately or additionally be applied.

Prior to providing the status-link modulated transmitter bias current to a transmitter, the status-link modulated transmitter bias current may also be modulated 906 with a primary data modulation signal, representative of a data-carrying electrical signal received from a host, although this is not required in all embodiments. In a typical embodiment, a data-carrying electrical signal received from a host may be line coded using 8B/10B, 64B/66B or some other encoding scheme designed to inhibit undesirably long strings of logic value zeros or logic value ones which may otherwise disrupt system operation. The line coding may occur in a driver, where further conditioning of the signal may occur, resulting in a primary data modulation signal. The primary data modulation signal can then be applied to the status-link modulated transmitter bias current and the resulting signal is provided to a transmitter, which emits 908 an optical signal representative of status data and/or primary data.

In order to avoid interfering with the main communication link(s), a transmitter bias current is effectively modulated with a low frequency signal to ensure that the status link modulation bandwidth is below a high pass cut-off frequency of the main communication link(s). This is also known as out of band (OOB) signaling. Although not illustrated, the transmitter bias current(s) may be low pass filtered to provide stable current(s) for the main communication link(s), which is consistent with keeping the status link modulation bandwidth below the high pass cut-off frequency of the main communication link(s).

FIG. 10 illustrates a method 1000 for detecting at the second device the status link established by the first device with the second device. Of course, a status link established by the second device with the first device may similarly be detected by the first device. The process begins after the first device effectively applies a status link modulation signal to at least one transmitter bias current to encode status data thereon and optically transmits the status data to the second device. The status data may be recovered by monitoring aspects of the received signal(s) since the status data controls the low frequency intensity modulation of the received optical data signal(s).

The second device receives 1002 one or more optical signals using one or more optical receivers, which convert 1004 the optical signal(s) to an electrical signal(s). It is contemplated that the status link modulation signal is such that it does not interfere with subsequent processing of the received signal(s). Accordingly, the electrical signal(s) may be provided to a post amplifier(s) for further processing without demodulating the status data from the electrical signal(s).

The receiver(s) comprises a photodetector such as a PIN, APD, or some other type of photodetector. The receiver(s) has a power supply that can source receiver bias current (e.g., diode bias current in the case where the photodetector is a diode). The reception of the status-link modulated optical signal by the receiver alters the receiver bias current produced by the receiver. For instance, the application by the first device of low frequency amplitude modulation to its transmitter bias current slightly varies the average transmit power of the optical signal received by the second device. The variations in average transmit power cause variations in the receiver bias current of the second device. Hence, the status link modulation may be monitored by detecting 1006 the receiver bias current(s) for OOB signaling, which may be accomplished in a number of ways.

In one embodiment of the invention, the receiver bias current(s) is detected by detecting the supply current of the receiver bias current power supply using sensors. If the second device has a controller such as the controller 800 of FIG. 8, the supply current may be detected using one or more of the external lines 816A, 816B. According to this embodiment, the controller may extract status data from the receiver bias current by interpreting highs and lows in the supply current as logic value ones and logic value zeros.

In another embodiment of the invention, the status data is extracted from the receiver bias current by detecting 1006 a digital receiver bias current value in the second controller. When implementing digital monitor and control methods, as may be done with some controllers, the receiver bias current may be converted by an analog to digital converter 808 into a digital receiver bias current value and provided to a processor 822. The processor 822 may extract the status data from the digital receiver bias current value by interpreting highs and lows in the receiver bias current value as logic value ones and logic value zeros.

Figure 11:
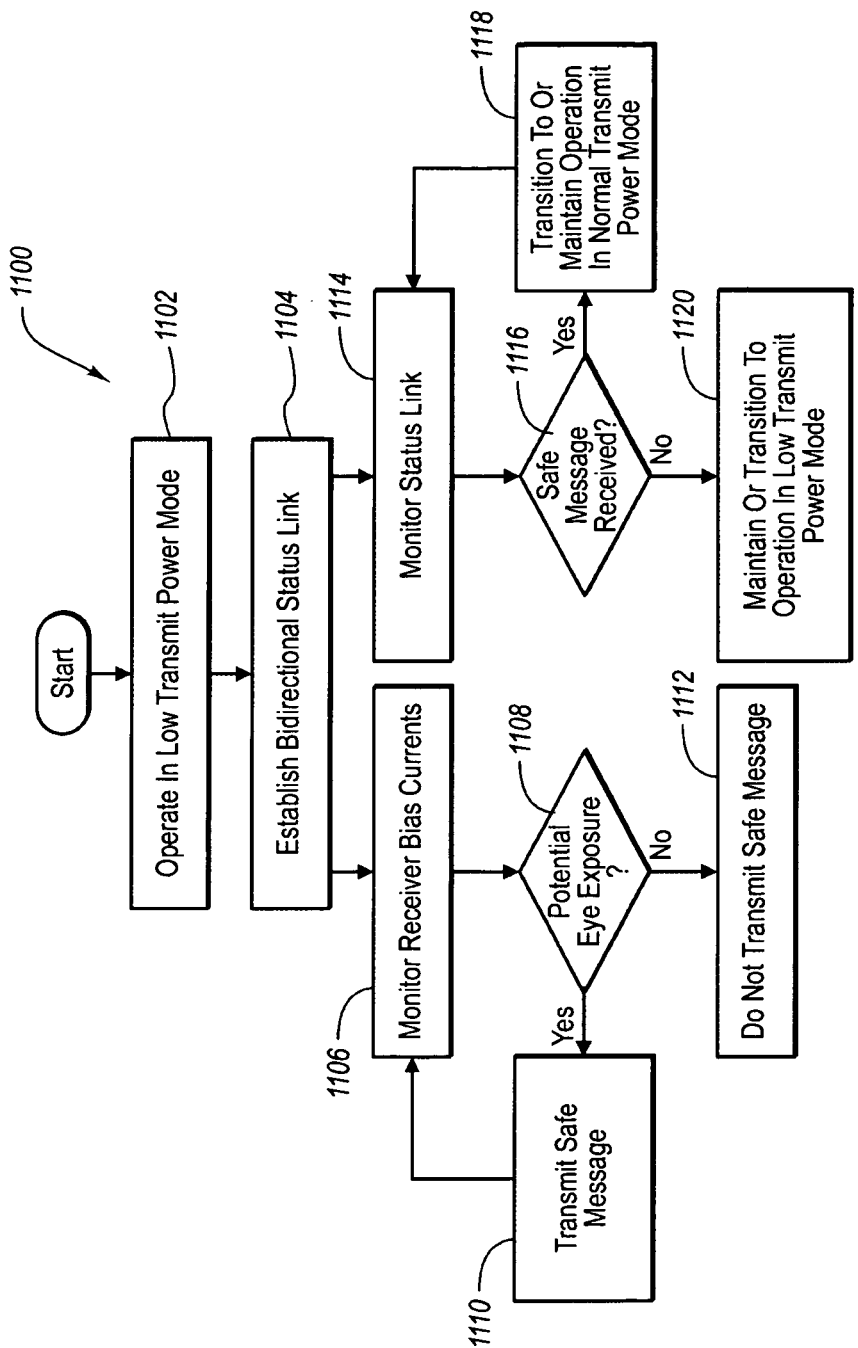
FIG. 11 illustrates a method for operating an optical link above nominal eye safety limits that may be implemented in embodiments of an integrated cable.

Now with regard to FIG. 11, a method 1100 is disclosed for operating a bidirectional optical link above eye safety limits using a status link. Some steps in the method 1100 may be implemented by a first device at one end of the link, while other steps may be implemented by a second device at the other end of the link. Thus, the method 1100 may be separable into two or more sub-methods. The optical link in which the method 1100 may be implemented may include a point-to-point bidirectional link such as the E-E integrated cable described in FIGS. 4 and 6, an E-O integrated cable coupled to an optical transceiver or transponder such as described in FIG. 5, or two transceivers or transponders communicably connected via an optical medium such as one or more optical fibers. The process 1100 begins with a controller of a first device and/or a controller of a second device initiating operation 1102 in a low transmit power mode in response to a triggering event. Triggering events include, but are not limited to, a device being powered on or reset and/or the controller of a device detecting a loss of signal or some other fault condition.

As previously indicated, the low transmit power mode is such that under all conditions the total transmit output power is under a particular or nominal eye safety limit. The nominal eye safety limit may be a set of eye safety limits, such as the IEC class 1 eye safety limits. In one embodiment, the total aggregate transmit power while operating in the low transmit power mode is set at a maximum possible value while still remaining at or slightly below the maximum eye safety limit. The low transmit power mode may be achieved by reducing the magnitude of a transmitter bias current supplied to a transmitter, by maintaining the magnitude of the transmitter bias current but operating it at a low duty cycle, or by any combination of the two.

Each controller establishes 1104 a status link with the other controller by generating status data, effectively modulating a transmitter bias current with the status data and emitting an optical signal representative of the status data over an optical medium for receipt by the other controller. The status data transmitted over the status link may be generated by monitoring 1106 the receiver bias current values associated with the receiver of each connector. For instance, the first controller may monitor the receiver bias current(s) of the receiver(s) of the first device (e.g., the "first receiver(s)") and the second controller may monitor the receiver bias current(s) of the receiver(s) of the second device (e.g., the "second receiver(s)"). If the first controller determines 1108, by monitoring the receiver bias current value(s) of the first receiver(s), that an optical signal(s) transmitted from the second device to the first device is not potentially exposed to view, the first controller generates status data indicating it is safe to operate above eye safety limits, which status data may also be referred to as a "safe message". The safe message is then transmitted 1110 to the second controller over the status link by effectively modulating the transmitter bias current(s) of the transmitter(s) of the first device (the "first transmitter(s)") with the safe message.

The determination that an optical signal(s) transmitted from the second device to the first device is not potentially exposed to view is made in one embodiment by comparing the detected receiver bias current(s) to a threshold value. If the receiver bias current(s) is above the threshold value, this indicates the optical link is intact and the corresponding optical signal is not potentially exposed to view. If below the threshold value, this indicates the optical link is not intact and the corresponding optical signal is potentially exposed to view.

Similarly, if the second controller determines 1108, by monitoring the receiver bias current value(s) of the second receiver(s), that an optical signal(s) transmitted from the first device to the second device is not potentially exposed to view, the second controller may generate a safe message which is transmitted 1110 to the first controller using the status link established between the second controller and the first controller. Each controller may monitor 1106 the status of each of the first and second receiver(s) at all times and continuously send 1110 the safe message to the other controller as long as each controller determines that the optical link is intact.

If the first controller determines 1108 that the optical signal(s) transmitted from the second device to the first device is potentially exposed to view, the first controller does not generate and transmit 1112 a safe message to the second controller. Similarly, if the second controller determines 1108 that the optical signal(s) transmitted from the first device to the second device is potentially exposed to view, the second controller does not generate and transmit 1112 a safe message to the first controller.

The optical signal(s) transmitted from one device to the other device may be potentially exposed to view for any of a number of reasons. For instance, an optical fiber over which a transmitter emits an optical signal may be severed. Alternately, an optical connector (such as the LC plug of FIG. 5) may be unplugged.

Each controller continues to monitor 1106 receiver bias current(s) and does not send a safe message to the other controller so long as it continues to determine that a portion of the optical link is not intact.

At the same time that each controller is monitoring receiver bias current(s) to determine whether the optical link is intact, each controller may also monitor 1114 the status link established with it by the other controller to determine 1116 whether it is safe to operate above eye safety limits. Each controller monitors the status link by detecting OOB signals in the receiver bias current(s), as discussed above with respect to FIG. 10. More particularly, the second controller monitors 1114 the status link established with it by the first controller and the first controller monitors 1114 the status link established with it by the second controller.

If a controller detects a safe message in the OOB signal of the status link, it determines 1116 that it is safe to operate above eye safety limits. Accordingly, it may transition 1118 to a normal transmit power mode by, for example, increasing the magnitude and/or the duty cycle of the transmitter bias current(s) supplied to its transmitter(s). In the normal transmit power mode, primary data and status data may be simultaneously transmitted. The optical link budget of the optical link is usually above the nominal eye safety limit in the normal transmit power mode, particularly when there are multiple bidirectional optical channels in the optical link and/or for high data rates and/or for long reach links. Each controller continues to monitor 1114 the status link and maintain 1118 operation in normal transmit power mode as long as it continues to detect the safe message in the status link.

If a controller does not detect a safe message, it determines 1116 that it is not safe to operate above eye safety limits and maintains 1020 operation in low transmit power mode (or it transitions 1120 to the low transmit mode if it was previously operating in the normal transmit power mode). Each controller continues to monitor 1114 the status link and maintain 1120 operation in the low transmit power mode as long as it does not detect the safe message from the other controller indicating it is safe to operate at an aggregate optical output power that is above eye safety limits.

Advantageously, the present invention permits an optical link to operate above eye safety transmit power limitations so long as devices at both ends of the optical link adhere to the status link and eye-safety protocols described with regard to FIGS. 9 through 11. Such devices may be referred to as status-link enabled devices, connectors, transponders, or transceivers. Notwithstanding the advantages obtained by having a status-link enabled device at both ends of an optical link, some optical links may have only one status-link enabled device. For instance, the E-O integrated cable of FIG. 5 may have a status-link enabled connector 561 on one end of the cable. However, it may be coupled via the optical plug 565 to a non-status-link enabled transceiver 566. As another example, a first status-link enabled transceiver may be coupled to a second non-status-link enabled transceiver via a standard cable. Accordingly, it would be advantageous to permit interoperation of a status-link enabled device with a second device regardless of whether the second device is status-link enabled.

Figure 12:
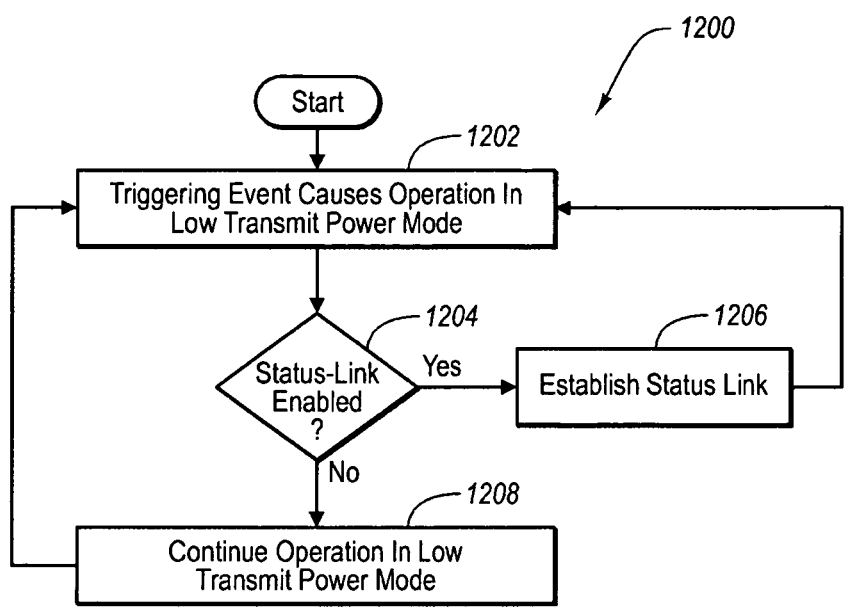
FIG. 12 illustrates a method for interoperating a status-link enabled integrated cable with a non status-link enabled optoelectronic device.

One method 1200 for interoperating a status-link enabled device with a second device is illustrated in FIG. 12. The method begins after a triggering event causes 1202 the controller of a status-link enabled device to operate in a low transmit power mode. The triggering event may be one of the triggering events described above.

While operating in the low transmit power mode, the status-link enabled device determines 1204 whether the second device is status-link enabled. This determination may include, for instance the second device attempting to establish a main communication link with the status-link enabled device without establishing a status link, in which case the status-link enabled device may determine that the second device is not status-link enabled.

Alternately, the status-link enabled device may attempt to establish a status link with the second device, asking the second device to establish a status link with the status-link enabled device as acknowledgement. The status-link enabled device may wait for an acknowledgement from the second device for a specified time, which could be enforced by a countdown timer in the controller of the status-link enabled device. If the status-link enabled device does not receive an acknowledgement within the prescribed time, it may determine that the second device is not status-link enabled.

If the status-link enabled device determines 1204 that the second device is a status-link enabled device, the two devices can establish 1206 a bidirectional status link and perform status-link enabled functions, such as actively maintaining eye safety by transitioning between the low transmit power mode and the normal transmit power mode as described with regard to FIG. 11.

If the status-link enabled device determines 1204 that the second device is not status-link enabled, the status-link enabled device continues to operate 1208 in the low transmit power mode. Although the status-link enabled device may not be able to operate as efficiently or optimize its performance while operating in the low transmit power mode, it should still be able to establish one or more main communication links with the non-status-link enabled device while preserving eye safety.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a first optoelectronic device, a method of actively maintaining eye safety while permitting operation of the first optoelectronic device above a nominal eye safety limit, the method comprising:

initiating operation in a transmit power mode in which average transmit optical power is below a nominal eye safety limit, including transmitting primary data from the first optoelectronic device to a second optoelectronic device in the transmit power mode in which average transmit optical power is below the nominal eye safety limit;

monitoring a status link established by the second optoelectronic device with the first optoelectronic device for first status data indicative that it is safe for the first optoelectronic device to transmit one or more optical signals to the second optoelectronic device at an aggregate optical transmit power that is greater than the nominal eye safety limit;

in response to not detecting the first status data, maintaining operation in the transmit power mode in which average optical power is below the nominal eye safety limit;

in response to detecting the first status data, transitioning to a transmit power mode in which the average transmit optical power is above the nominal eye safety limit;

monitoring a first optical link comprising a first electro-optical transducer of the second optoelectronic device, a first opto-electrical transducer of the first optoelectronic device, and a first optical fiber coupled therebetween to determine whether one or more optical signals transmitted from the second optoelectronic device to the first optoelectronic device over the second optical link are potentially exposed to view;

if the first optoelectronic device determines that one or more optical signals transmitted over the first optical link are not potentially exposed to view, transmitting to the second optoelectronic device second status data indicative that it is safe for the second optoelectronic device to transmit one or more optical signals to the first optoelectronic device at an aggregate optical transmit power that is greater than the nominal eye safety limit; and if the first optoelectronic device determines that one or more optical signals transmitted over the first optical link are potentially exposed to view, not transmitting the second status data to the second optoelectronic device.

2. The method of claim 1, wherein:

the first optoelectronic device includes:

the first opto-electrical transducer coupled to a first end of the first optical fiber external to the first optoelectronic device such that when a first optical signal is present on the first optical fiber, the first opto-electrical transducer receives the first optical signal and converts the first optical signal into a first electrical signal which is provided through a first electrical interface to a host; and a second electro-optical transducer coupled through the first electrical interface to the host and configured to receive from the host a second electrical signal, wherein when the second electrical signal is received from the host, the second electro-optical transducer converts the second electrical signal into a second optical signal and provides the second optical signal to a second optical fiber coupled to the first electro-optical transducer and external to the first optoelectronic device; and the first optoelectronic device, the first optical fiber and the second optical fiber are integrated within a single integrated cable.

3. The method of claim 2, wherein the nominal eye safety limit includes one or more IEC Class 1 eye safety limits.

4. The method of claim 2, wherein the second electro-optical transducer, the second optical fiber, and a second opto-electrical transducer of the second optoelectronic device are included within a second optical link.

5. The method of claim 1, wherein monitoring the first optical link to determine whether one or more optical signals transmitted from the second optoelectronic device to the first optoelectronic device over the first optical link are potentially exposed to view includes:

detecting a receiver bias current of the first opto-electrical transducer; and comparing the receiver bias current to a threshold value.

6. The method of claim 1, further comprising, establishing a status link with the second optoelectronic device.

7. In a first optoelectronic device that is status-link enabled, a method of interoperating with a second optoelectronic device, the method comprising:

in response to a triggering event, operating in a transmit power mode in which average transmit optical power is below a nominal eye safety limit, including transmitting primary data from the first optoelectronic device to the second optoelectronic device in the transmit power mode in which average transmit optical power is below the nominal eye safety limit;

determining that the second optoelectronic device is status-link enabled;

transitioning to a transmit power mode in which average optical power is above the nominal eye safety limit;

monitoring one or more receiver bias currents of one or more optical receivers of the first optoelectronic device to determine whether one or more optical signals transmitted from the second optoelectronic device to the first optoelectronic device are potentially exposed to view;

in response to determining, based on the one or more monitored receiver bias currents, that one or more optical signals transmitted from the second optoelectronic device to the first optoelectronic device are not potentially exposed to view, transmitting to the second optoelectronic device status data indicative that it is safe for the second optoelectronic device to transmit at an aggregate optical transmit power that is greater than the nominal eye safety limit; and in response to determining, based on the one or more monitored receiver bias currents, that one or more optical signals transmitted from the second optoelectronic device to the first optoelectronic device are potentially exposed to view, not transmitting the second status data to the second optoelectronic device.

8. The method of claim 7, wherein:

the first optoelectronic device includes:

a first optical receiver coupled to a first end of a first optical fiber external to the first optoelectronic device such that when a first optical signal is present on the first optical fiber, the first optical receiver receives the first optical signal and converts the first optical signal into a first electrical signal which is provided through a first electrical interface to a host; and a first optical transmitter coupled through the first electrical interface to the host and configured to receive from the host a second electrical signal, wherein when the second electrical signal is received from the host, the first optical transmitter converts the second electrical signal into a second optical signal and provides the second optical signal to a second optical fiber coupled to the first optical transmitter and external to the first optoelectronic device; and the first optoelectronic device, the first optical fiber and the second optical fiber are integrated within a single integrated cable.

9. The method of claim 8, wherein a triggering event includes at least one of:

powering on the first optoelectronic device;

resetting the first optoelectronic device;

detecting a loss of signal from the second optoelectronic device; or detecting a fault condition.

10. The method of claim 8, wherein the first optoelectronic device is configured, in response to being communicatively coupled to a non-status-link enabled optoelectronic device, to determine that the non-status-link enabled optoelectronic device is not status-link enabled, wherein determining that the non-status-link enabled optoelectronic device is not status-link enabled includes one or more of:

the non-status-link enabled optoelectronic device not establishing a status link with the first optoelectronic device within a prescribed time after the first optoelectronic device requests that the non-status-link enabled optoelectronic device do so using a status link established by the first optoelectronic device with the non-status-link enabled optoelectronic device; and the non-status-link enabled optoelectronic device establishing a main communication link but not a status link with the first optoelectronic device.

11. The method of claim 8, wherein operation in the transmit power mode in which average transmit optical power is below the nominal eye safety limit is achieved by reducing transmit power relative to the transmit power mode in which average transmit optical power is above the nominal eye safety limit.

12. The method of claim 11, wherein reducing transmit power includes one or more of:

reducing the magnitude of a transmitter bias current for the first electro-optical transducer; and reducing the duty cycle of the transmitter bias current.

13. The method of claim 12 wherein the total transmit power of the first optoelectronic device while operating in the transmit power mode in which average transmit optical power is below the nominal eye safety limit is set at a maximum possible value while still remaining at or slightly below the maximum eye safety limit.

14. In a first optoelectronic device, a method of actively maintaining eye safety while permitting operation of the first optoelectronic device above a nominal eye safety limit, the method comprising:

initiating operation in a transmit power mode in which average transmit optical power is below a nominal eye safety limit;

monitoring a status link established by a second optoelectronic device with the first optoelectronic device for status data indicative that it is safe for the first optoelectronic device to transmit one or more optical signals to the second optoelectronic device at an aggregate optical transmit power that is greater than the nominal eye safety limit;

in response to not detecting the status data, maintaining operation in the transmit power mode in which average optical power is below the nominal eye safety limit; and in response to detecting the status data, transitioning to a transmit power mode in which the average transmit optical power is above the nominal eye safety limit;

wherein:

the first optoelectronic device includes:

a first opto-electrical transducer coupled to a first end of a first optical fiber external to the first optoelectronic device; and a first electro-optical transducer coupled to a second optical fiber external to the first optoelectronic device; and the first electro-optical transducer, the second optical fiber, and a second opto-electrical transducer of the second optoelectronic device are included within a first optical link;

the first opto-electrical transducer, the first optical fiber, and a second electro-optical transducer of the second optoelectronic device are included within a second optical link;

the method further comprising:

monitoring the second optical link to determine whether one or more optical signals transmitted from the second optoelectronic device to the first optoelectronic device over the second optical link are potentially exposed to view;

establishing a status link with the second optoelectronic device over the first optical link;

if the first optoelectronic device determines that one or more optical signals transmitted over the second optical link are not potentially exposed to view, transmitting to the second optoelectronic device second status data indicative that it is safe for the second optoelectronic device to transmit one or more optical signals to the first optoelectronic device at an aggregate optical transmit power that is greater than the nominal eye safety limit; and if the first optoelectronic device determines that one or more optical signals transmitted over the second optical link are potentially exposed to view, not transmitting the second status data to the second optoelectronic device.

15. The method of claim 7, further comprising:

determining, based on the one or more monitored receiver bias currents, that one of the one or more optical signals transmitted by the second optoelectronic device to the first optoelectronic device is attenuating over time; and transmitting to the second optoelectronic device status data instructing the second optoelectronic device to adjust a transmit power of a corresponding optical transmitter of the second optoelectronic device to compensate for the attenuation.

* * * * *